INVENTORS.
KEITH G. BRADY
HOLDEN W. WITHINGTON
BY Roy Mattern Jr.
ATTORNEY

United States Patent Office 2,749,060
Patented June 5, 1956

2,749,060

AIRPLANE WING

Keith G. Brady and Holden W. Withington, Seattle, Wash., assignors to Boeing Airplane Company, Seattle, Wash., a corporation of Delaware Application July 1, 1952, Serial No. 296,678

1 Claim. (Cl. 244—44)

This invention relates to wing constructions of airplanes and more particularly to improvements in variably positioned leading edge portions of wings.

The invention comprises a wing, a flexible leading edge portion in the wing and a mechanism to deflect the leading edge portion relative to the wing without interrupting the continuity of the upper surface and without compressing or elongating any skin material.

The alteration of the shape of an entire wing or a portion thereof during flight to acquire the best aerodynamic characteristics at specified air speeds has been an objective of former designs. However, the adjustable features previously devised have involved interruption and irregularities in the skin surfaces.

It is therefore the purpose of the invention to provide a deflective leading edge on a wing while maintaining an integral, smooth upper skin surface thereby reducing the drag to a minimum and assuring uniform air flow over the top surface of the wing.

The purpose will be more clearly understood from the following description written with reference to the drawings wherein the same parts are noted throughout the several views by like numerals. In the drawings.

Figure 1:
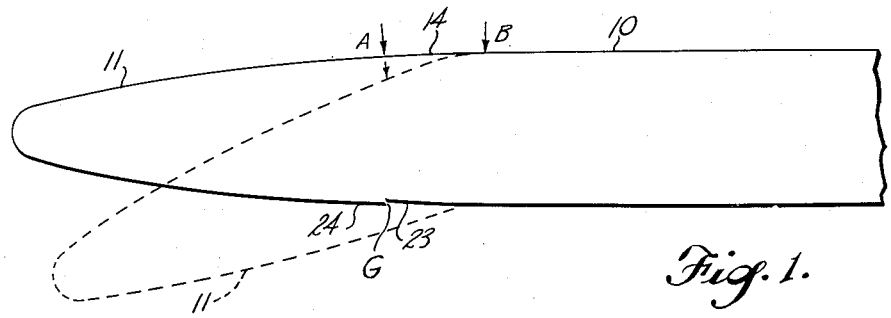
Figure 1 is a sectional outline of the forward part of a wing with the dotted lines indicating the deflection of the leading edge portion.

More particularly, the invention comprises the wing 10 and the deflective leading edge portion 11 capable of movement through approximately thirty degrees as indicated in Figure. 1.

Figure 2:
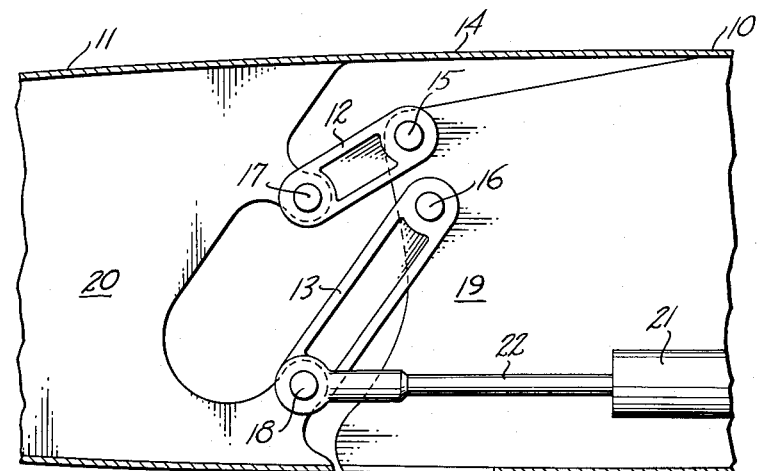
Figure 2 is a section through the wing where a deflecting linkage unit is installed.
Figure 3:
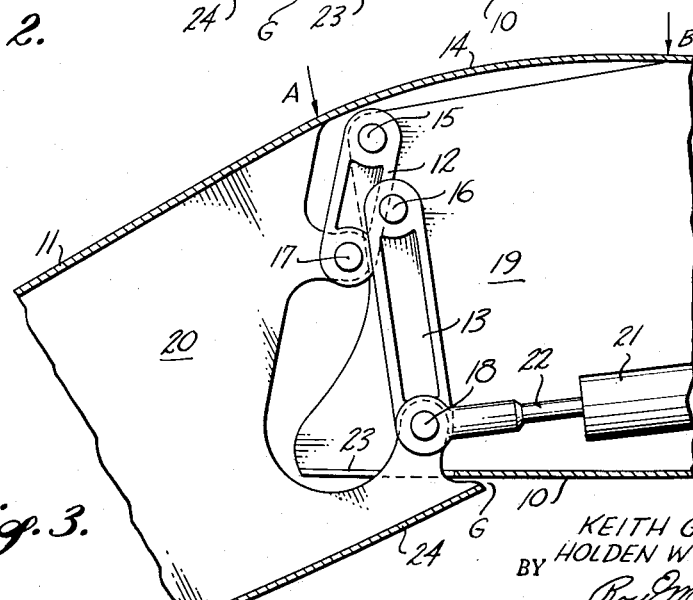
Figure 3 is a section similar to Figure 2 with the linkage unit arranged to deflect the leading edge portion.

The arrangement of a typical suitable linkage unit, as illustrated in Figures 2 and 3, comprises two pivotal links 12 and 13 mounted one above the other with the ends of each link pin mounted respectively to the leading edge portion 11 and the wing 10. The length of each link and its position relative to the other members are engineered to acquire the desired flexure of the top surface 14 of the wing 10 and leading edge portion 11.

The flexure of the surface 14 occurs between the points A and B indicated by the arrows, without substantial compression or extension of the neutral axis of the skin 14. The movement of the links 12 and 13 about their respective pivots 15 and 16 creates deflective forces that are applied to the leading edge portion 11 through the pins 17 and 18. Bending of the surface 14 occurs without changing the surface distance between the points A and B. This result is assured by the proper selection of the link sizes and the locations of the connecting points on the respective brace-supports 19 and 20 in the wing 10 and in the leading edge portion 11. The primary consideration being at all times to move point A along an arcuate path equidistant from the point B as measured adjacent to the flexing surface.

The motivating force can be applied through a hydraulic cylinder 21 with the piston rod 22 connected to the pin 18 as shown in Figures 2 and 3, or by some other suitable means.

In each linkage unit, the respective links are located in different planes insuring adequate clearance. The linkage units are spaced apart across the wing within complementary recesses that are provided in the bracing structure.

With regard to the lower edge 23, the members are arranged so that the gap designated by the letter "G" between the skin materials of the wing 10 and the leading edge portion 11 remains substantially negligible. The formed projection 24 overlaps the wing skin as the deflection occurs. Upon the completion of the motion the gap "G" is closed as illustrated in Figure 3.

The primary aerodynamic use of the deflective leading edge portion of the wing occurs during both take-off and landing operations. By properly combining the control of the deflective leading edge with the control of other movable aerodynamic surfaces a landing is made safely at lower speeds over a correspondingly reduced runway distance.

The deflection of the leading edge alters the air flow characteristics around the wing. The burble point in the air flow over the wing is postponed until a higher angle of attack is obtained. This facilitates flying at a slower speed at a greater angle of attack while still maintaining sufficient lift to avoid the danger of stalling.

A secondary aerodynamic use of the deflective leading edge portion of the wing occurs at high speeds for gaining added control of the airplane during pitch or yaw motions.

As thus illustrated and described the inventive deflective leading edge portion of the wing creates these advantages without appreciably increasing the drag by reason of its design which maintains the continuity of the flexible top surface of the wing.

Having now particularly described and ascertained the nature of my invention and in what manner the same is to be performed, I declare that what I claim is:

An adjustable camber wing comprising a rigid body portion, a rigid nose portion, a flexible continuous skin forming one surface of both said portions and attaching them together, links interconnecting the body portion and the nose portion and spaced apart along the length of the wing, said links including short links pivotally attached to the body portion adjacent the flexible skin and to the nose portion more remotely from said skin, and long links pivotally attached to the body portion more remotely from said skin than said short links and to the nose portion more remotely from said skin than said short links, an actuator mounted in said body portion and attached to said nose portion to move said nose portion with respect to said body portion, said links being proportioned and arranged to guide the nose portion in a path which results in bending of the flexible skin without substantial compression or extension of the neutral axis of said skin.

References Cited in the file of this patent

UNITED STATES PATENTS

| | | |
|---|---|---|
| 1,635,687 | Page | July 12, 1927 |
| 1,813,485 | Cook | July 7, 1931 |
| 1,890,059 | Lake | Dec. 6, 1932 |
| 2,022,806 | Grant | Dec. 3, 1935 |
| 2,563,453 | Briend | Aug. 7, 1951 |
| 2,608,364 | Gordon et al. | Aug. 26, 1952 |
| 2,650,047 | Carhart et al. | Aug. 25, 1953 |